United States Patent
Sun

(10) Patent No.: US 8,632,447 B2
(45) Date of Patent: Jan. 21, 2014

(54) CHAIN-TYPE TOOL MAGAZINE

(75) Inventor: Ying Sun, Taichung Hsien (TW)

(73) Assignee: Chen Sound Industrial Co., Ltd., Taichung Hsien (TW)

( * ) Notice: Subject to any disclaimer, the term of this patent is extended or adjusted under 35 U.S.C. 154(b) by 625 days.

(21) Appl. No.: 12/985,334

(22) Filed: Jan. 5, 2011

(65) Prior Publication Data
US 2012/0172186 A1 Jul. 5, 2012

(51) Int. Cl.
*B23Q 3/157* (2006.01)

(52) U.S. Cl.
USPC .................. 483/68; 483/62; 483/42; 483/3

(58) Field of Classification Search
USPC .......... 483/68, 66, 62, 41, 3, 60, 42; 211/1.56
See application file for complete search history.

(56) References Cited

U.S. PATENT DOCUMENTS

| | | | |
|---|---|---|---|
| 5,554,087 A * | 9/1996 | Hwang et al. | 483/62 |
| 6,042,524 A * | 3/2000 | Kato | 483/62 |
| 6,514,184 B2 * | 2/2003 | Oitaka et al. | 483/68 |
| 7,575,543 B1 | 8/2009 | Sun et al. | |
| 2008/0039306 A1* | 2/2008 | Yang | 483/68 |

FOREIGN PATENT DOCUMENTS

| | | | | |
|---|---|---|---|---|
| JP | 61-136750 A | * | 6/1986 | |
| JP | 61-168443 A | * | 7/1986 | |
| JP | 61-168445 A | * | 7/1986 | |
| JP | 03-092237 A | * | 4/1991 | |
| JP | 2001-259951 A | * | 9/2001 | |
| JP | 2002-273633 A | * | 9/2002 | |
| JP | 2004-160595 A | * | 6/2004 | |
| JP | 2005-081448 A | * | 3/2005 | |

\* cited by examiner

*Primary Examiner* — Erica E Cadugan

(57) ABSTRACT

A chain-type magazine includes a box, a chain-type conveyor and a spinning unit. The box includes a port defined therein. The chain-type conveyor includes links connected to one another so that each of the links can be pivoted relative to the other links about two axes in parallel to each other. A tool can be inserted in a holder inserted in each of the links. The spinning unit includes a mounting assembly, an elevating assembly, a rotary claw assembly and a connecting rod. The mounting assembly is connected to the box. The elevating assembly is movably connected to the mounting assembly. The rotary claw assembly is rotationally connected to the mounting assembly for catching a selected one of the links. The connecting rod connects the elevating assembly to the rotary claw assembly. The driving element drives the elevating assembly to spin the rotary claw assembly.

17 Claims, 8 Drawing Sheets

CHAIN-TYPE TOOL MAGAZINE

BACKGROUND OF INVENTION

1. Field of Invention

The present invention relates to a chain-type tool magazine for tools of a machining center and, more particularly, to a chain-type tool magazine for directing the axis of a selected tool in parallel to the axis of a spindle of a machining center.

2. Related Prior Art

A machining center includes a spindle for driving various tools for executing various types of machining (or "tooling"). The machining center further includes a magazine for storing the tools and a tool-changing robot for changing the tools.

A chain-type magazine includes a chain-type conveyor including holders each for holding the shank of one of the tools. With the chain-type conveyor, the tools are moved, one after another, to the vicinity of the tool-changing robot. With the tool-changing robot, a selected one of the tools is moved from the related holder and substituted for a tool originally connected to the spindle. The axis of each of the holders is perpendicular to the axis of the spindle. Hence, the tool-changing robot must take many steps to complete its task. It has to move forward and backward to take the shank of the selected tool from the related holder, and then change the angle of the selected tool, and finally insert the shank of the selected tool into a cavity defined in the spindle. It requires a complicated structure and takes a lot of time to complete the task. Hence, the efficiency of the machining of a work-piece is reduced, and the cost of the work-piece is high. Moreover, the cost of maintaining the machining center is high because of the complicated structure. In addition, conventional chain-type magazines are however complicated and expensive. Furthermore, tool-changing robots are devised according to the conventional chain-type magazine and are therefore expensive.

The present invention is therefore intended to obviate or at least alleviate the problems encountered in prior art.

SUMMARY OF INVENTION

It is the primary objective of the present invention to provide a machining center with a chain-type magazine for storing tools so that the axis of a selected one of the tools can be located in parallel to the axis of a spindle of the machining center.

To achieve the foregoing objective, the chain-type magazine includes a box, a chain-type conveyor and a spinning unit. The box includes a port defined therein. The chain-type conveyor includes links connected to one another so that each of the links can be pivoted relative to the other links about two axes in parallel to each other. A tool can be inserted in a holder inserted in each of the links. The spinning unit includes a mounting assembly, an elevating assembly, a rotary claw assembly and a connecting rod. The mounting assembly is connected to the box. The elevating assembly is movably connected to the mounting assembly. The rotary claw assembly is rotationally connected to the mounting assembly for catching a selected one of the links. The connecting rod connects the elevating assembly to the rotary claw assembly. The driving element drives the elevating assembly to spin the rotary claw assembly.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
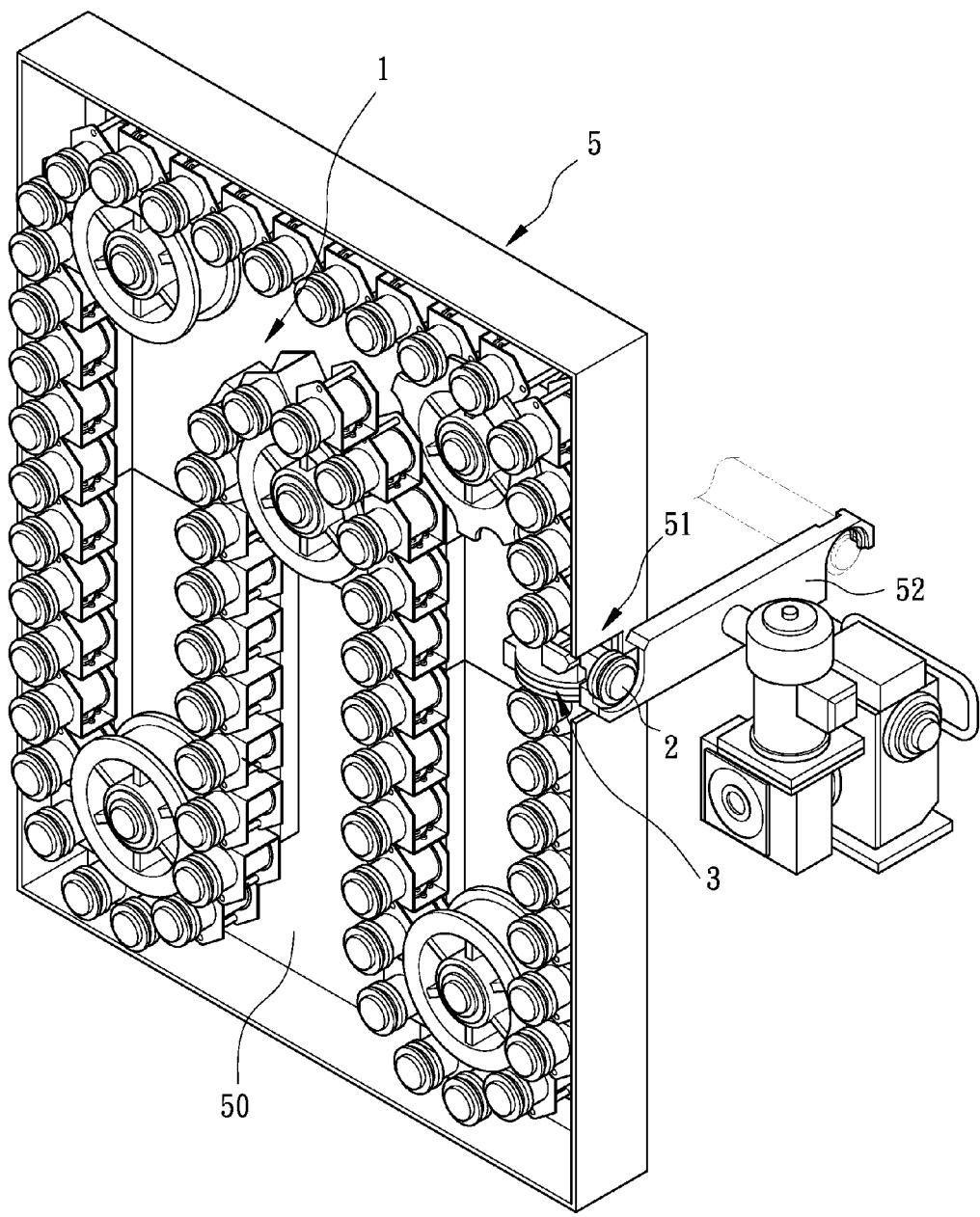
FIG. 1 is a perspective view of a chain-type magazine according to the preferred embodiment of the present invention.

Referring to FIG. 1, there is shown a chain-type magazine 5 according to the preferred embodiment of the present invention. The chain-type magazine 5 is used together with a tool-changing robot 52 of a machining center. The chain-type magazine 5 includes a box 50, a chain-type conveyor 1 and a spinning unit 3. The box 50 includes a port 51 defined therein. The tool-changing robot 52 is located in the vicinity of the port 51. The chain-type conveyor 1 is located in the box 50.

Figure 2:
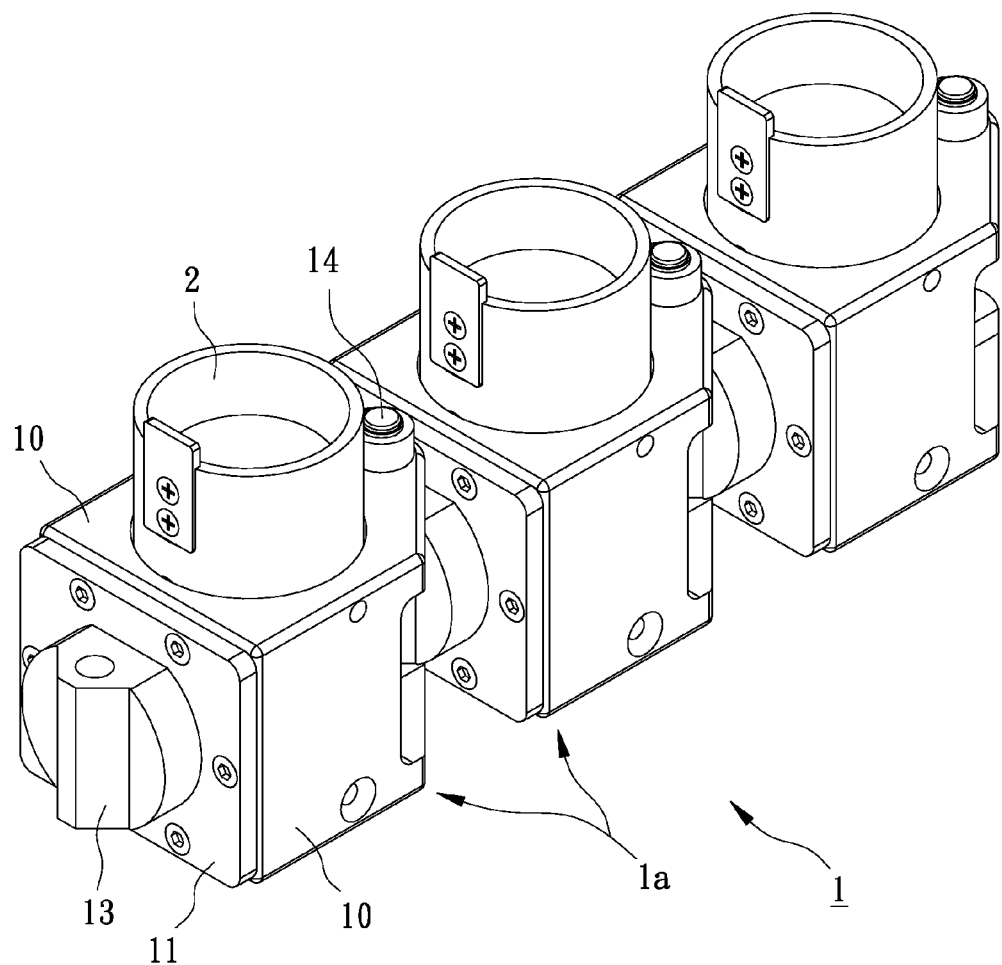
FIG. 2 is an enlarged partial view of a chain-type conveyor used in the chain-type magazine shown in FIG. 1.
Figure 3:
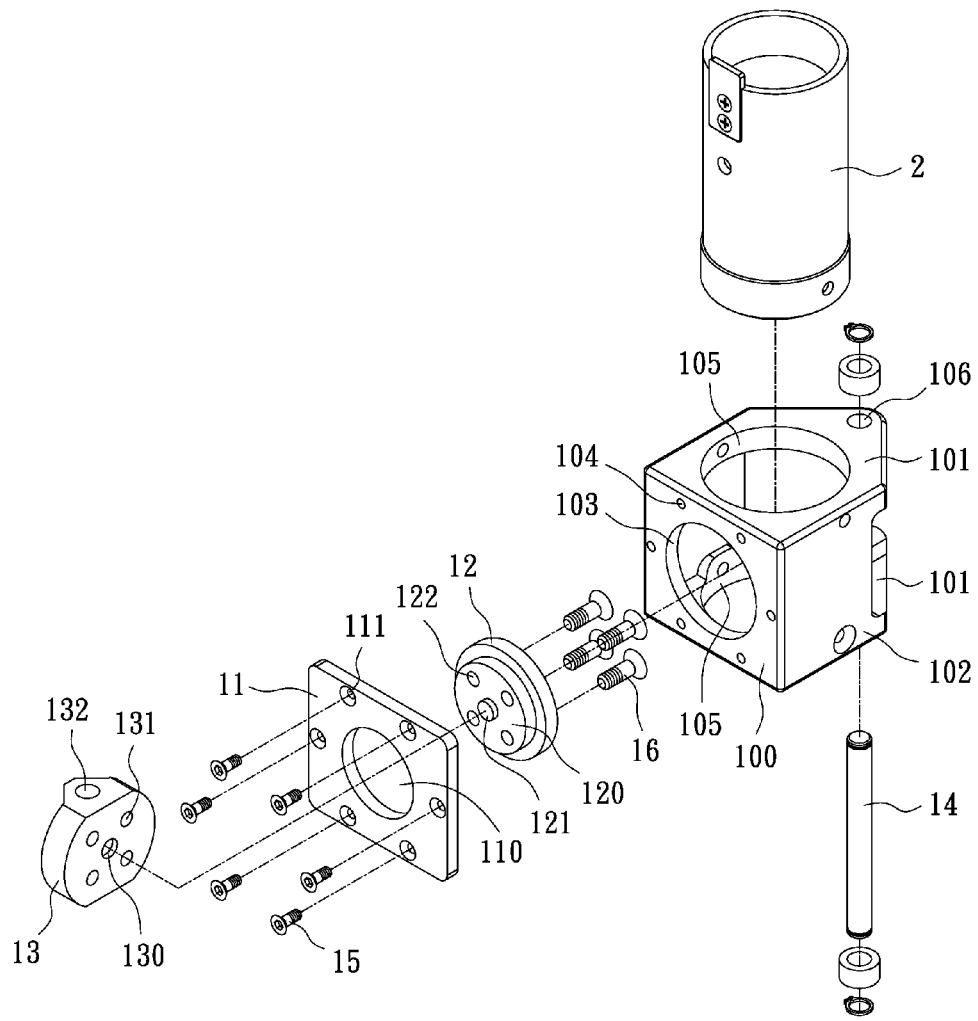
FIG. 3 is an exploded view of a link of the chain-type conveyor shown in FIG. 2.
Figure 4:
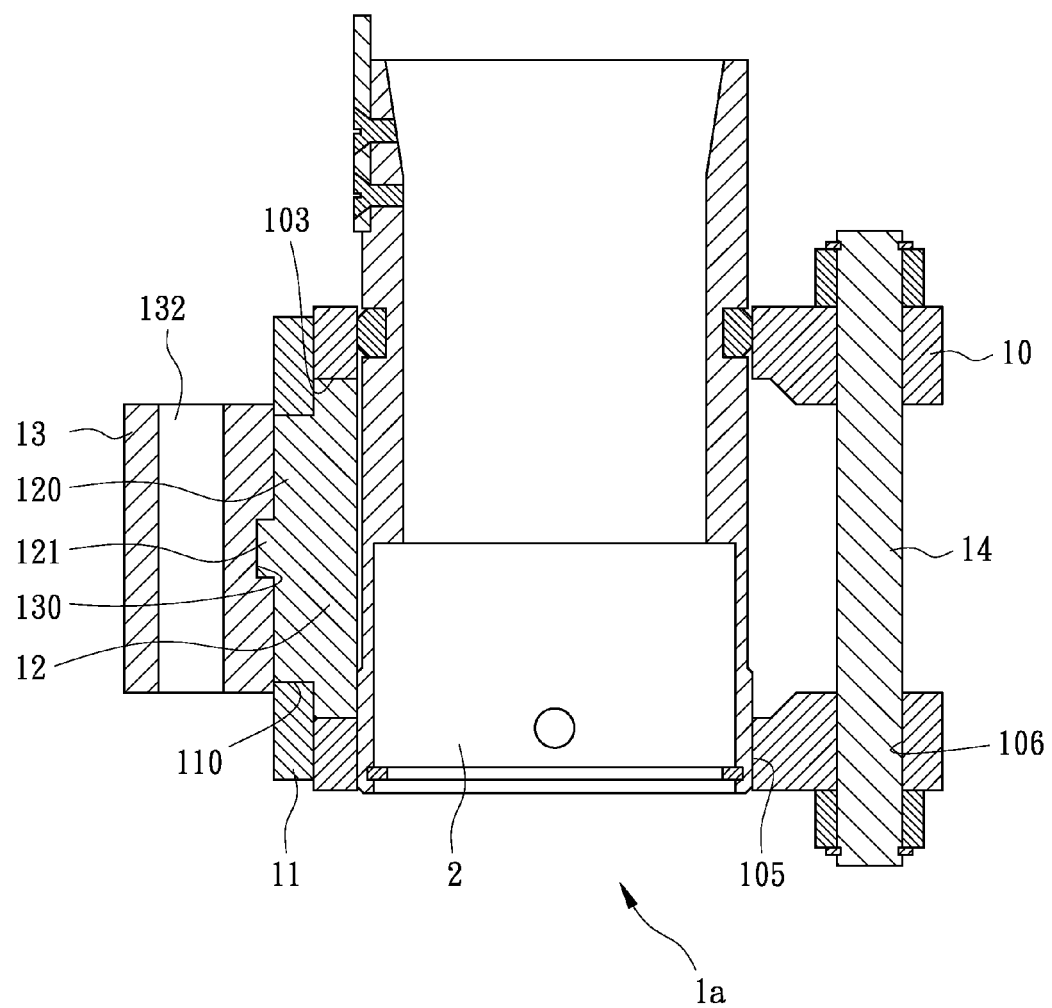
FIG. 4 is a cross-sectional view of the link shown in FIG. 3.

Referring to FIGS. 2 through 4, the chain-type conveyor 1 includes many links 1*a* connected to one another so that each of the links 1*a* can be pivoted relative to the other links 1 about two axes in perpendicular to each other. Each of the links 1*a* includes a frame 10, a reinforcing element 11, a rotational element 12 and a joint 13.

The frame 10 includes an end plate 100, two opposite primary lateral plates 101 and two opposite secondary lateral plates 102. The end plate 100, the primary lateral plates 101 and the secondary lateral plates 102 are connected to one another at the right angle, and preferably made one. The end plate 100 includes an opening 103 centrally defined therein and screw holes 104 defined therein around the opening 103. Each of the primary lateral plates 101 includes an opening 105 defined therein and an aperture 106 defined therein. The opening 105 is made larger and located closer to the end plate 100 than the aperture 106 is.

The reinforcing element 11 is a plate with an opening 110 centrally defined therein and apertures 111 defined therein around the opening 110. The opening 110 is located corresponding to the opening 105. The apertures 111 are located corresponding to the screw holes 104.

The rotational element 12 includes a round base, a round plateau 120 centrally formed on the round base, a boss 121 centrally formed on the round plateau 120, and apertures 122 defined therein around the boss 121. The round base of the rotational element 12 is made corresponding to the opening 103. The round plateau 121 is made corresponding to the opening 110.

The joint 13 is substantially a round disc with a recess 130 centrally defined therein, screw holes 131 defined therein around the recess 130, and a tunnel 132 defined therein along a diameter. The recess 130 is made corresponding to the boss 121. The screw holes 131 are made corresponding to the apertures 122.

To assemble each of the links 1a, the reinforcing element 11 is located against the end plate 100 of the frame 10 before screws 15 are driven in the screw holes 104 via the apertures 111 to secure the reinforcing element 100 to frame 10. The round base of the rotational element 12 is located in the opening 103 of the end plate 100 of the frame 10 while the round plateau 120 is located in the opening 110 of the reinforcing element 11. The joint 13 is located against the rotational element 12, with the recess 130 receiving the boss 121 before screws 16 are driven in the screw holes 131 through the apertures 122 to secure the joint 13 to the rotational element 12. Thus, the joint 13 and the rotational element 12 together are rotationally located on the frame 10 and the reinforcing element 11. A holder 2 is inserted through the openings 105 of the primary lateral plates 101 of the frame 10 of each of the links 1a.

A pin 14 is inserted in the apertures 106 of the primary lateral plates 101 of the frame 10 of each of the links 1a and the tunnel 132 of the joint 13 of an adjacent one of the links 1a. Thus, the links 1a are pivotally connected to one another. That is, the chain-like conveyor 1 is made.

Figure 5:
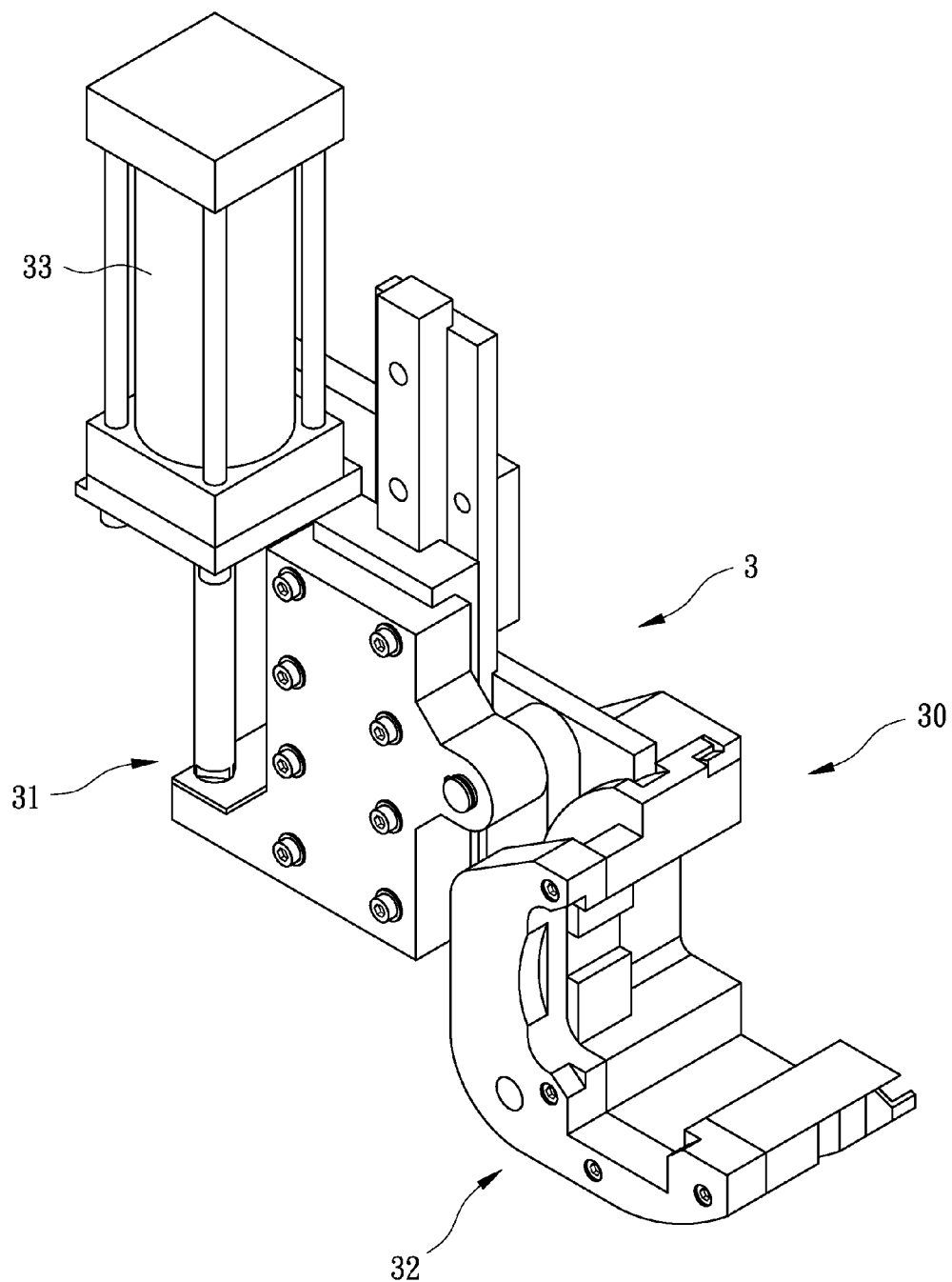
FIG. 5 is an enlarged perspective view of a spinning unit used in the chain-type magazine shown in FIG. 1 but biased for 90°.
Figure 6:
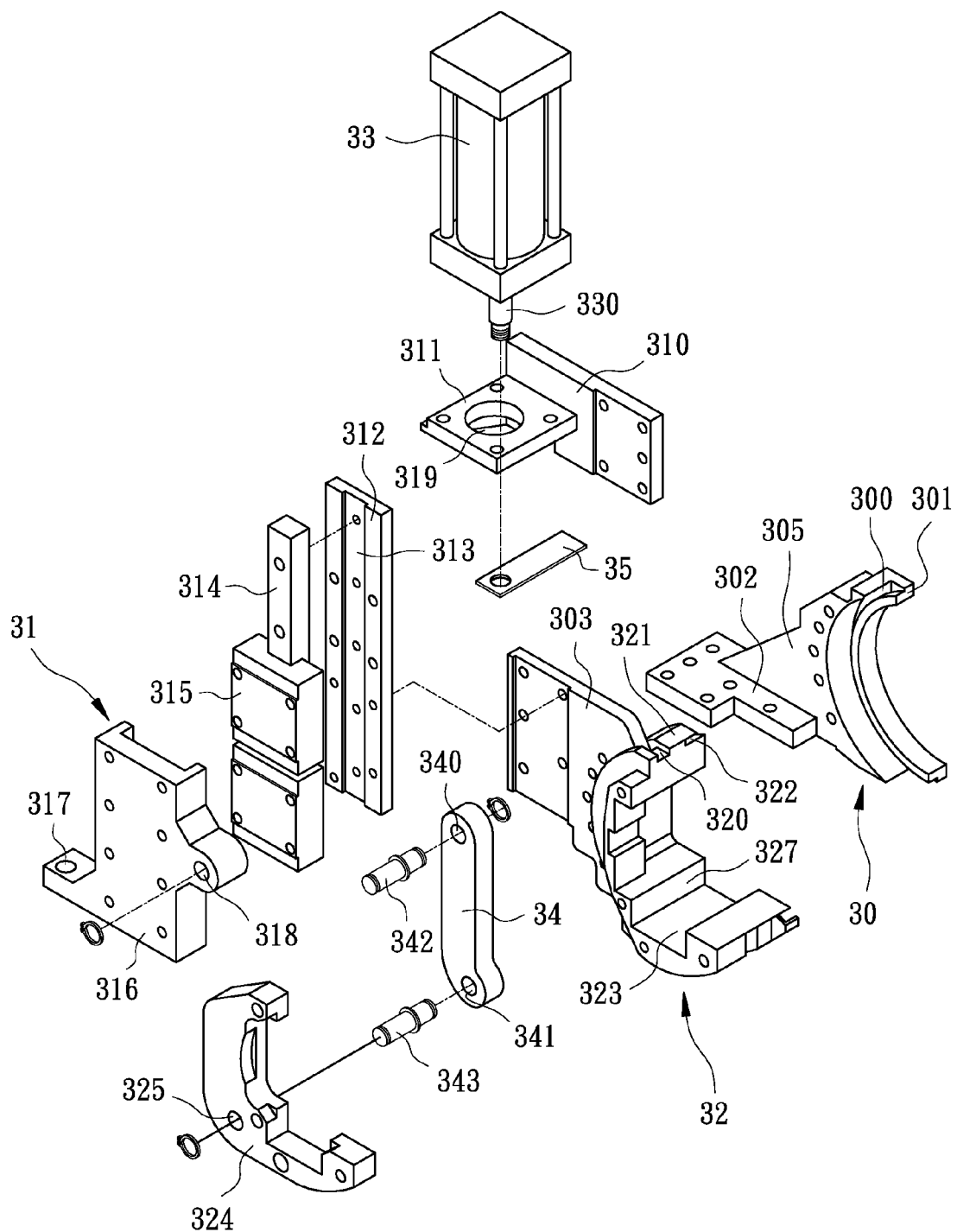
FIG. 6 is an exploded view of the spinning unit of FIG. 5.

Referring to FIGS. 5 and 6, the spinning unit 3 includes a mounting assembly 30, an elevating assembly 31, a rotary claw assembly 32, a driving element 33 and a connecting rod 34. The mounting assembly 30 includes a mounting plate 305 and a restraining plate 303. The mounting plate 305 includes an arched groove 300 defined therein, an arched rail 301 formed thereon along the arched groove 300, and a base 302 formed thereon. The restraining plate 303 includes an arched edge formed thereon.

The rotary claw assembly 32 includes a primary claw 327 and a secondary claw 324. The primary claw 327 includes an arched peripheral groove 320 defined therein, an arched lateral rail 321 formed thereon, an arched lateral groove 322 defined therein along the arched lateral rail 321, and a contact 323 formed thereon. The arched peripheral groove 320 is made corresponding to the arched edge of the restraining plate 303. The arched lateral rail 321 is made corresponding to the arched groove 300. The arched lateral groove 322 is made corresponding to the arched rail 301.

The elevating assembly 31 includes a securing plate 310, a supporting plate 311, a track 312, a slide 314, a block 315 and a connector 316. The supporting plate 311 extends from the securing plate 310 perpendicularly and includes an opening 319 defined therein. The track 312 includes a groove 313 defined therein. The slide 314 is made corresponding to the groove 313. The block 315 is formed on the slide 314. The connector 316 includes two apertures 317 and 318 defined therein.

The driving element 33 is a hydraulic cylinder, a pneumatic cylinder, a solenoid valve or a motor for example. The driving element 33 includes a rod 330 movably extending from an end.

The connecting rod 34 includes two apertures 340 and 341 defined therein. The aperture 340 is made corresponding to the aperture 318. The aperture 341 is made corresponding to the aperture 325.

To assemble the spinning unit 3, the arched lateral rail 321 is movably located in the arched groove 300 while the arched lateral groove 322 receives the arched rail 301 movably. The arched peripheral groove 320 movably receives the arched edge of the restraining plate 303. The restraining plate 303 is attached to the mounting plate 305 by screws for example. The secondary claw 324 is attached to the primary claw 327 by screws for example. Thus, the rotary claw assembly 32 is rotationally connected to the mounting assembly 30.

A portion of the track 312 is connected to the restraining plate 303 and another portion of the track 312 is connected to the securing plate 310. The slide 314 is movably located in the groove 313. The connector 316 is connected to the block 315.

The driving element 33 is supported on the supporting plate 311. The rod 330 is inserted through the opening 319 and the aperture 317 before a threaded tip thereof is engaged with a nut (not shown). An end of a pin 342 is inserted in the aperture 318 while another end of the pin 342 is inserted in the aperture 340. An end of a pin 343 is inserted in the aperture 325 while another end of the pin 343 is inserted in the aperture 341.

The base 302 is attached to the box 50 near the port 51. Thus, the spinning unit 3 is located near the port 51.

There is a sensor 35 attached to an end of the rod 330. The sensor 35 is used to sense the movement of the spinning unit 3. Thus, the movement of the rod 330 is precisely under control.

Figure 7:
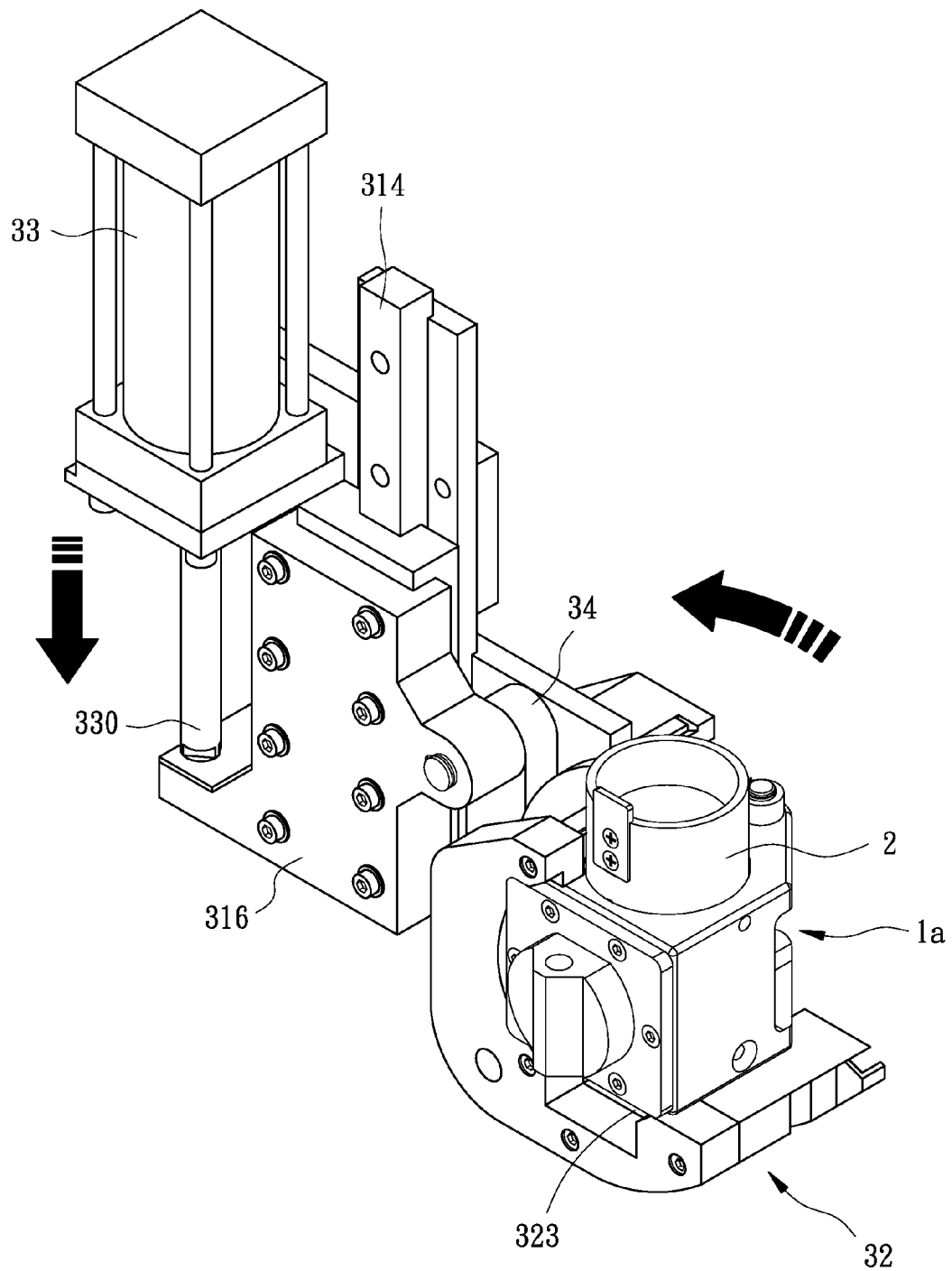
FIG. 7 is a perspective view of a tool engaged with the spinning unit shown in FIG. 5.
Figure 8:
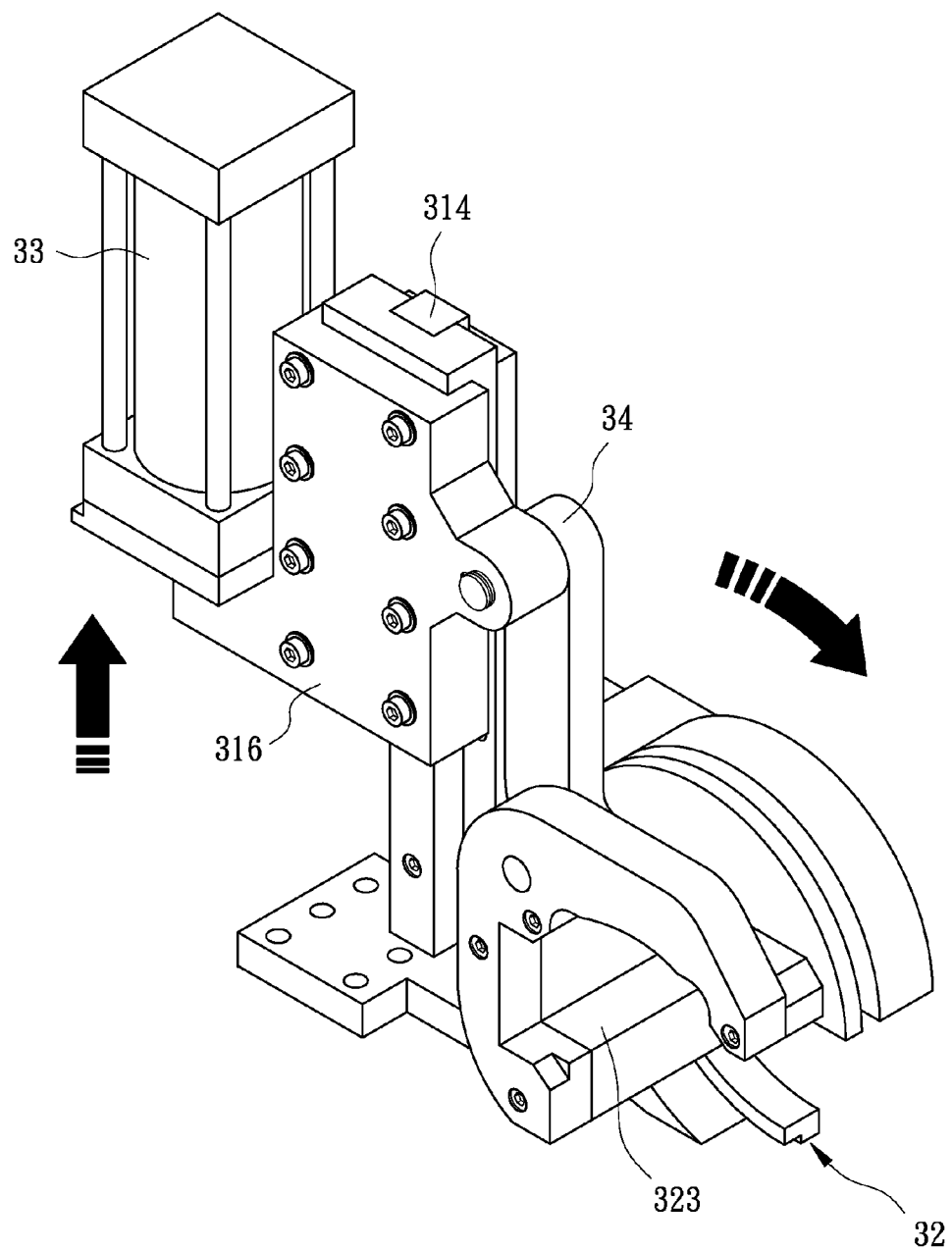
FIG. 8 is a perspective view of the spinning unit in another position than shown in FIG. 7.

Referring to FIGS. 7 and 8, the operation of the chain-type magazine 5 will be described. In operation, the shank of a tool is inserted in each of the holders 2 carried by a related one of the links 1a of the chain-type conveyor 1. The tools are conveyed, one after another, past the spinning unit 3 while the rod 330 is extended from the driving element 33. The chain-type conveyor 1 is stopped when a selected one of the tools is located in the spinning unit 3. Then, the spinning unit 3 is actuated. In detail, the rod 330 is withdrawn into the driving element 33. Through the connector 316, the block 315 and the slide 314 are lifted along the track 312. Through the connecting rod 34, the secondary claw 324 and the primary claw 327 are pivoted. Hence, the selected tool is spun and moved out of the box 50 through the port 51 by the secondary claw 324 and the primary claw 327. Now, the axis of the selected tool is in parallel to the axis of an originally used tool engaged with a spindle of a machining center.

The tool-changing robot 52 is actuated to substitute the selected tool for the originally used tool. At first, the tool-changing robot 52 pulls the selected tool from the related holder 2 and the originally used tool from the spindle of the machining center. Secondly, the tool-changing robot 52 spins to interchange the positions of the selected tool and the originally used tool. Finally, the tool-changing robot 52 engages the selected tool with the spindle of the machining center and inserts the originally used tool into the related holder 2.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:
1. A chain-type magazine including:
 a box including a port defined therein;
 a chain-type conveyor including:
  links connected to one another so that each of the links can be pivoted relative to the other links about two axes that are perpendicular to each other; and
  holders each connected to a related one of the links for holding a tool; and
 the chain-type magazine also including:
 a spinning unit including
  a mounting assembly connected to the box;
  an elevating assembly movably connected to the mounting assembly;

a rotary claw assembly rotationally connected to the mounting assembly for catching a selected one of the links;

a connecting rod for connecting the elevating assembly to the rotary claw assembly; and a driving element for driving the elevating assembly to spin the rotary claw assembly and the selected link about one of the axes;

wherein the mounting assembly includes a mounting plate and a restraining plate, wherein the claw assembly includes a claw located between the mounting plate and the restraining plate, wherein the mounting plate includes an arched groove defined therein, wherein the claw includes an arched rail movable inserted in the arched groove of the mounting plate, and wherein the claw includes an arched peripheral groove for movably receiving an arched edge of the restraining plate.

2. The chain-type magazine according to claim 1, wherein each of links includes:

a frame including:
an end plate including an opening defined therein;
two opposite primary lateral plates connected to the end plate and each formed with an aperture and an opening for holding the related holder; and
two opposite secondary lateral plates connected to the end plate and the primary lateral plates;

each of the links also including:
a rotational element located on a side of the end plate of the frame;
a joint including a tunnel defined therein, wherein the joint is located on an opposite side of the end plate from the rotational element, and wherein the joint is connected to the rotational element by at least one fastener inserted through the opening of the end plate so that the joint and the rotational element are rotationally connected to the end plate; and
a pin inserted through the apertures of the primary lateral plates and the tunnel of the joint.

3. The chain-type magazine according to claim 2, wherein each of the links further includes a reinforcing element attached to the respective end plate of the respective frame.

4. The chain-type magazine according to claim 3, wherein each of the reinforcing elements includes an opening smaller than the opening of the respective end plate of the respective frame, wherein the respective rotational element includes a round plateau rotationally inserted in the respective opening of the respective reinforcing element while the respective rotational element is rotationally inserted in the respective opening of the respective end plate of the respective frame.

5. The chain-type magazine according to claim 1, wherein the claw is a primary claw, and wherein the claw assembly further includes a secondary claw attached to the primary claw.

6. The chain-type magazine according to claim 1, wherein the mounting plate includes an arched rail formed thereon along the arched groove of the mounting plate, and wherein the claw includes an arched groove for receiving the arched rail of the mounting plate.

7. The chain-type magazine according to claim 1, wherein the spinning unit is configured to spin the selected link about the one of the axes to a position where the selected tool extends through the port.

8. The chain-type magazine according to claim 1, wherein the elevating assembly includes a track and a slide, and wherein the track includes a groove for receiving the slide movably.

9. The chain-type magazine according to claim 1, wherein the driving element includes a driving rod, and wherein the driving element further includes a sensor for detecting movement in order to precisely control the movement of the driving rod.

10. A chain-type magazine including:
a box including a port defined therein;
a chain-type conveyor including:
links connected to one another so that each of the links can be pivoted relative to the other links about two axes that are perpendicular to each other; and
holders each connected to a related one of the links for holding a tool; and
the chain-type magazine also including:
a spinning unit including
a mounting assembly connected to the box;
an elevating assembly movably connected to the mounting assembly;
a rotary claw assembly rotationally connected to the mounting assembly for catching a selected one of the links;
a connecting rod for connecting the elevating assembly to the rotary claw assembly; and
a driving element for driving the elevating assembly to spin the rotary claw assembly and the selected link;

wherein the mounting assembly includes a mounting plate and a restraining plate, wherein the claw assembly includes a claw located between the mounting plate and the restraining plate, wherein the mounting plate includes an arched rail formed thereon, wherein the claw includes an arched groove for receiving the arched rail of the mounting plate, and wherein the claw includes an arched peripheral groove for movably receiving an arched edge of the restraining plate.

11. The chain-type magazine according to claim 10, wherein each of links includes:

a frame including:
an end plate including an opening defined therein;
two opposite primary lateral plates connected to the end plate and each formed with an aperture and an opening for holding the related holder; and
two opposite secondary lateral plates connected to the end plate and the primary lateral plates;

each of the links also including:
a rotational element located on a side of the end plate of the frame;
a joint including a tunnel defined therein, wherein the joint is located on an opposite side of the end plate from the rotational element, and wherein the joint is connected to the rotational element by at least one fastener inserted through the opening of the end plate so that the joint and the rotational element are rotationally connected to the end plate; and
a pin inserted through the apertures of the primary lateral plates and the tunnel of the joint.

12. The chain-type magazine according to claim 11, wherein each of the links further includes a reinforcing element attached to the respective end plate of the respective frame.

13. The chain-type magazine according to claim 12, wherein each of the reinforcing elements includes an opening smaller than the opening of the respective end plate of the respective frame, wherein the respective rotational element includes a round plateau rotationally inserted in the respective opening of the respective reinforcing element while the respective rotational element is rotationally inserted in the respective opening of the respective end plate of the respective frame.

14. The chain-type magazine according to claim 10, wherein the claw is a primary claw, and wherein the claw assembly further includes a secondary claw attached to the primary claw.

15. The chain-type magazine according to claim 10, wherein the spinning unit is configured to spin the selected link about the one of the axes to a position where the selected tool extends through the port.

16. The chain-type magazine according to claim 10, wherein the elevating assembly includes a track and a slide, and wherein the track includes a groove for receiving the slide movably.

17. The chain-type magazine according to claim 10, wherein the driving element includes a driving rod, and wherein the driving element further includes a sensor for detecting movement in order to precisely control the movement of the driving rod.

* * * * *